United States Patent
Sun et al.

(10) Patent No.: US 11,418,843 B2
(45) Date of Patent: Aug. 16, 2022

(54) FORWARDING VIDEO-ON-DEMAND FLOW (71) Applicant: NEW H3C TECHNOLOGIES CO., LTD., Hangzhou (CN)

(72) Inventors: Kai Sun, Beijing (CN); Jiajia Liu, Beijing (CN)

(73) Assignee: New H3C Technologies Co., Ltd., Hangzhou (CN)

(*) Notice: Subject to any disclaimer, the term of this patent is extended or adjusted under 35 U.S.C. 154(b) by 360 days.

(21) Appl. No.: 16/625,648

(22) PCT Filed: Jun. 20, 2018

(86) PCT No.: PCT/CN2018/092002
§ 371 (c)(1),
(2) Date: Dec. 20, 2019

(87) PCT Pub. No.: WO2018/233632
PCT Pub. Date: Dec. 27, 2018

(65) Prior Publication Data
US 2021/0160576 A1    May 27, 2021

(30) Foreign Application Priority Data

Jun. 23, 2017  (CN) .......................... 201710486215.2

(51) Int. Cl.
*H04N 21/472* (2011.01)
*H04L 12/28* (2006.01)
(Continued)

(52) U.S. Cl.
CPC ..... *H04N 21/47202* (2013.01); *H04L 12/287* (2013.01); *H04L 12/4633* (2013.01);
(Continued)

(58) Field of Classification Search
None
See application file for complete search history.

(56) References Cited

U.S. PATENT DOCUMENTS

2014/0092907 A1    4/2014 Sridhar et al.
2014/0269705 A1    9/2014 DeCusatis et al.
(Continued)

FOREIGN PATENT DOCUMENTS

CN    103916634 A  *  7/2014
CN    106230668 A     12/2016
(Continued)

OTHER PUBLICATIONS

Japanese Patent Office, Office Action Issued in Application No. 2019-570922, dated Dec. 15, 2020, 7 pages (Submitted with Machine Translation).
(Continued)

*Primary Examiner* — Omar S Parra
(74) *Attorney, Agent, or Firm* — McCoy Russell LLP (57) ABSTRACT

Provided are a method and a device for forwarding a video-on-demand flow, which may be applied to a network with virtualization of network functions. In an example of the method, for a Virtual Broadband Remote Access Server (vBRAS) Service Orchestrator (vBRASSO) managing at least one vBRAS in a vBRAS resource pool in the network with virtualization of network functions, if a particular vBRAS completes user authentication, the vBRASSO determines a Point Of Presence (POP) switch for forwarding a video-on-demand flow to the user based on the user information from the vBRAS, and notifies the POP switch of a route for forwarding the video-on-demand flow to the user in such a way that the POP switch advertises the route to a core router configured to receive the video-on-demand flow from a video-playing source in the network with virtualization of network functions.

15 Claims, 3 Drawing Sheets

(51) Int. Cl.
  *H04L 12/46* (2006.01)
  *H04N 21/258* (2011.01)
  *H04N 21/438* (2011.01)
  *H04N 21/64* (2011.01)

(52) U.S. Cl.
  CPC ... *H04L 12/4645* (2013.01); *H04N 21/25875* (2013.01); *H04N 21/438* (2013.01); *H04N 21/64* (2013.01)

(56) References Cited

U.S. PATENT DOCUMENTS

| | | | |
|---|---|---|---|
| 2015/0229724 A1* | 8/2015 | Ray | H04L 45/745 370/352 |
| 2016/0226678 A1 | 8/2016 | Sridhar et al. | |
| 2017/0170989 A1 | 6/2017 | Sridhar et al. | |
| 2018/0097657 A1* | 4/2018 | Dao | H04L 47/32 |
| 2018/0152322 A1 | 5/2018 | Sridhar et al. | |
| 2018/0205575 A1 | 7/2018 | Tian | |
| 2019/0379558 A1 | 12/2019 | Sridhar et al. | |

FOREIGN PATENT DOCUMENTS

| | | |
|---|---|---|
| CN | 106254095 A | 12/2016 |
| CN | 106453124 A | 2/2017 |
| CN | 106559292 A | 4/2017 |
| CN | 106559451 A | 4/2017 |
| EP | 2536068 A1 | 12/2012 |
| EP | 2747350 A1 | 6/2014 |
| WO | 2014028094 A1 | 2/2014 |
| WO | 2014208538 A1 | 12/2014 |
| WO | 2016121293 A1 | 8/2016 |
| WO | 2017054757 A1 | 4/2017 |

OTHER PUBLICATIONS

European Patent Office, Office Action Issued in Application No. 18821317.7, dated Feb. 26, 2021, Germany, 5 pages.

ISA State Intellectual Property Office of the People's Republic of China, Written Opinion of the International Searching Authority Issued in Application No. PCT/CN2018/092002, dated Sep. 18, 2018, WIPO, 8 pages.

European Patent Office, Extended European Search Report Issued in Application No. 18821317.7, dated Apr. 15, 2020, Germany, 8 pages.

ISA State Intellectual Property Office of the People's Republic of China, International Search Report Issued in Application No. PCT/CN2018/092002, dated Sep. 18, 2018, WIPO, 4 pages.

State Intellectual Property Office of the People's Republic of China, Office Action and Search Report Issued in Application No. 201710486215.2, dated Apr. 19, 2019, 6 pages. (Submitted with Partial Translation).

European Patent Office, Office Action Issued in Application No. 18821317.7, dated Oct. 20, 2021, Germany, 5 pages.

* cited by examiner

FORWARDING VIDEO-ON-DEMAND FLOW

CROSS REFERENCE TO RELATED APPLICATIONS

The present application is a U.S. National Phase of International Patent Application Serial No. PCT/CN2018/092002 entitled "FORWARDING OF VIDEO-ON-DEMAND STREAM," filed on Jun. 20, 2018. International Patent Application Serial No. PCT/CN2018/092002 claims priority to Chinese Patent Application No. 201710486215.2, filed on Jun. 23, 2017, The entire contents of each of the above-cited applications are hereby incorporated by reference in their entirety for all purposes.

BACKGROUND

In a network scenario with virtualization of network functions, a Virtual Broadband Remote Access Server (vBRAS) may be established and operated on a general-purpose server to substitute a Broadband Remote Access Server (BRAS), so as to reduce deployment difficulty and cost. For example, a vBRAS resource pool may include a plurality of vBRASs established on the general-purpose server, so that broadband users are served by the plurality of vBRASs instead of one physical BRAS

BRIEF DESCRIPTION OF THE DRAWINGS

The accompanying drawings herein are incorporated in and constitute a part of this specification, illustrate examples consistent with the present disclosure, and serve to explain the principle of the present disclosure together with the specification.

DETAILED DESCRIPTION OF THE EMBODIMENTS

Since general-purpose servers located with vBRASs in a vBRAS resource pool have a high CPU processing efficiency and a capability for memory extension but constrained hardware network card performance, the vBRAS resource pool may have a high control processing capability and a low data forwarding capability. In contrary, a physical switch, for example, a Point of Presence (POP) switch, has a high data forwarding capability and a low control processing capability. Based on this, in a network scenario with virtualization of network functions, the vBRAS resource pool may perform control to bring its high control processing capability into full play, and a physical switch, for example, a POP switch, may perform data forwarding to make full use of its high data forwarding capability, so that forwarding function and control function can be separated to effectively achieve high-performance video-on-demand.

The present disclosure will be described in detail below in conjunction with the accompanying drawings and specific examples.

Figure 1:
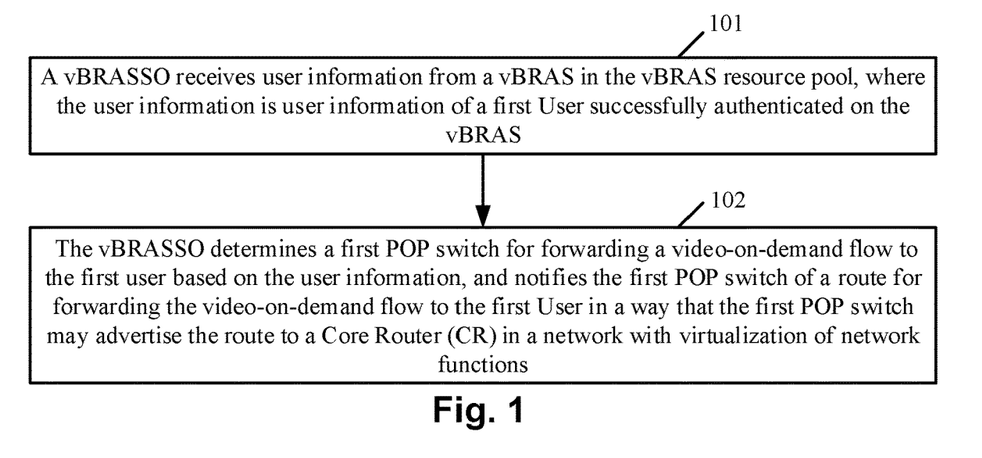
FIG. 1 is a flowchart illustrating a method based on an example of the present disclosure.

FIG. 1 is a flowchart illustrating a method based on an example of the present disclosure. The method may be applied to a vBRAS Service Orchestrator (vBRASSO) in a network with virtualization of network functions.

In an example, a vBRASSO functions to establish and deploy a vBRAS resource pool in a network with virtualization of network functions. Different vBRASs in the vBRAS resource pool may operate on a same physical server (for example, an x86 server), or may operate on different physical servers (for example, x86 servers), which is not limited herein.

As shown in FIG. 1, the process may include the following blocks.

At block 101, a vBRASSO may receive user information from a vBRAS in the vBRAS resource pool, where the user information is user information of a first user successfully authenticated on the vBRAS.

It may be seen from block 101 that, in the present disclosure, the first user is authenticated by the vBRAS in the vBRAS resource pool, which makes full use of a high control processing capability of the vBRAS resource pool.

In an example, the user information may include a Media Access Control (MAC) address of the first user, a network identifier encapsulated in a packet received by the vBRAS from the first user, and an Internet Protocol (IP) address assigned to the first user by the vBRAS when the first user is authenticated successfully. The IP address assigned to the first user by the vBRAS may be an idle IP address in a video-on-demand address pool corresponding to the vBRAS.

At block 102, the vBRASSO may determine a first POP switch for forwarding a video-on-demand flow to the first user based on the user information, and notify the first POP switch of a route for forwarding the video-on-demand flow to the first user. In this way, the first POP switch may advertise the route to a Core Router (CR) in the network with virtualization of network functions, where the CR may receive the video-on-demand flow from a video-playing source.

In an example, the route for forwarding the video-on-demand flow to the first user at the above block 102 may be a host route of the first user.

In another example, the route for forwarding the video-on-demand flow to the first user at the above block 102 may be a network segment route of an IP address network segment corresponding to the IP address of the first user. Because the IP address of the first user is an IP address in the video-on-demand address pool corresponding to the vBRAS, the network segment route corresponding to the IP address of the first user may also be referred to as a network segment route of the video-on-demand address pool corresponding to the vBRAS.

It may be seen from block 102 that the first POP switch instead of the vBRAS may advertise the route for forwarding the video-on-demand flow to the first user to the CR so that the CR can learn the route. Subsequently, if receiving a video-on-demand flow sent by the video-playing source to the first user, the CR may forward the video-on-demand flow based on the learned route, so as to send the video-on-demand flow to the first POP switch rather than the vBRAS. In this way, by allowing the first POP switch to participate in the forwarding of the video-on-demand flow, the high data forwarding capability of the first POP switch may be fully exerted, and also problems such as the low data forwarding capability caused by the participation of the vBRAS in the forwarding of the video-on-demand flow can be effectively avoided.

Thus, the process shown in FIG. 1 is completed.

It may be seen from the process shown in FIG. 1 that, in the present disclosure, the user authentication is performed by a vBRAS in the vBRAS resource pool managed by the vBRASSO so that the high control processing capability of the vBRAS resource pool can be fully exerted; while the video-on-demand flow of the user is processed by the POP switch, the high data forwarding capability of the POP switch can also be fully exerted. In this way, by separating control function and forwarding function, the processing performance for the video-on-demand flow may be effectively improved.

In an example, in a broadband virtual network applied in the present disclosure, an Openflow switch and a POP switch may be included at the same time. In the network, in order that a vBRAS in the vBRAS resource pool authenticates a user (referred to as a second user), the vBRASSO may send a flow entry to the Openflow switch to instruct the Openflow switch to send a first user control packet of the second user to the vBRASSO. Thus, when receiving a user control packet, (for example, a Point-Point Protocol Over Ethernet (PPPoE) protocol control packet, a Dynamic Host Configuration Protocol (DHCP) control packet or the like) from the second user, the Openflow switch may check whether the user control packet is the first user control packet of the second user. If yes, the Openflow switch may send the first user control packet to the vBRASSO based on the above flow entry.

When receiving the user control packet sent by the Openflow switch, the vBRASSO may select one vBRAS from the vBRAS resource pool managed by the vBRASSO and send the received user control packet to the selected vBRAS. Afterwards, the selected vBRAS may interact with the second user to eventually complete the authentication of the second user. During the interaction between the selected vBRAS and the second user, when receiving a user control packet from the second user again, the Openflow switch may directly send the user control packet to the selected vBRAS.

Figure 2:
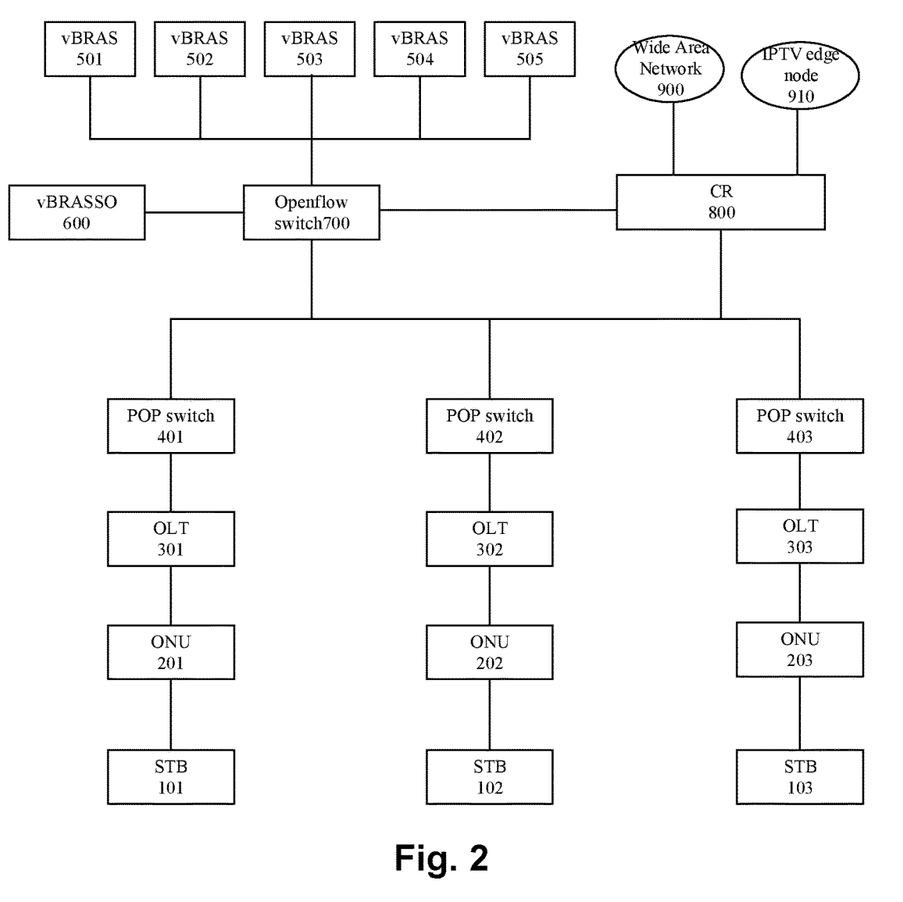
FIG. 2 is a schematic diagram illustrating a first application network based on an example of the present disclosure.

FIG. 2 is a schematic diagram illustrating a first application network based on an example of the present disclosure. Only one Openflow switch 700 and three POP switches 401, 402, 403 are exemplified in the broadband virtual network shown in FIG. 2.

In FIG. 2, a vBRASSO 600 manages the vBRAS resource pool shown in FIG. 2, and the vBRAS resource pool includes five vBRASs 501-505. Each of the five vBRASs 501-505 included in the vBRAS resource pool establishes a data channel with the vBRASSO 600.

In FIG. 2, the vBRASSO 600 may send a flow entry to the Openflow switch 700. The flow entry is used to instruct the Openflow switch 700 to send the first user control packet of a user to the vBRASSO 600.

A user Set Top Box (STB) 101 shown in FIG. 2 is taken as an example. Other users such as an STB 102 and an STB 103 shown in FIG. 2 are similar to the user STB 101, which will not be described herein.

The STB 101 may broadcast a user control packet (for example, a DHCP control packet) when going online. A destination MAC address of the user control packet broadcast by the STB 101 is a designated broadcast address, and a source MAC address of the user control packet is an MAC address of the STB 101 (for example, 78-AC-C0-9D-04-11). For convenience of description, the user control packet is denoted as a first packet here.

When receiving the first packet from the STB 101, an Optical Network Unit (ONU) 201 may add an inner-layer VLAN tag to the first packet. Here, it is assumed that the added inner-layer VLAN tag is 2000. For convenience of description, a packet obtained by adding the inner-layer VLAN tag to the first packet is denoted as a second packet here. Further, the ONU 201 may forward the second packet to an Optical Line Terminal (OLT) 301.

When receiving the second packet, the OLT 301 may add an outer-layer VLAN tag to the second packet. Here, it is assumed that the added outer-layer VLAN tag is 2000. For convenience of description, a packet obtained by adding the outer-layer VLAN tag to the second packet is denoted as a third packet here. Further, the OLT 301 may forward the third packet to the POP switch 401.

The POP switch 401 may forward the third packet to the Openflow switch 700.

When receiving the third packet, the Openflow switch 700 may identify the third packet as the first user control packet of the STB 101, and then send the third packet to the vBRASSO 600 based on the above flow entry.

When receiving the third packet, the vBRASSO 600 may select one vBRAS (for example, the vBRAS 501) from the five vBRASs 501-505 in the managed vBRAS resource pool based on a load balancing principle, and send the third packet to the vBRAS 501.

When receiving the third packet, the vBRAS 501 may generate a response packet to be returned to the STB 101 and send the response packet to the Openflow switch 700.

When receiving the response packet returned by the vBRAS 501 to the STB 101, the Openflow switch 700 may record a correspondence between the STB 101 and the vBRAS 501 locally and send the response packet to the STB 101. Finally, the response packet will reach the STB 101.

Afterwards, the STB 101 may interact with the vBRAS 501 so that the vBRAS 501 can complete authentication for the STB 101. After completing the authentication of the STB 101, the vBRAS 501 may select an idle IP address from the video-on-demand address pool corresponding to the vBRAS 501 and assign the idle IP address to the STB 101 so that the STB 101 may interact with the vBRAS 501 based on the assigned IP address to complete establishment of a session, etc., thus enabling the STB 101 to go online.

It is noted that, during the interaction between the vBRAS 501 and the STB 101, the STB 101 may also send user control packets. In this case, when receiving another user control packet from the STB 101, the Openflow switch 700 may directly send the user control packet to the vBRAS 501 rather than to the vBRASSO 600 based on the above recorded correspondence between the STB 101 and the vBRAS 501.

The vBRAS 501 may report the user information of the STB 101 to the vBRASSO 600 through the data channel established between the vBRAS 501 and the vBRASSO 600. The user information may include the IP address (for example, 10.1.1.1) and the MAC address (for example, 78-AC-C0-9D-04-11) of the STB 101 and a network identifier encapsulated in the user control packet received by the vBRAS 501 from the STB 101. The network identifier herein may specifically include an inner-layer VLAN tag and an outer-layer VLAN tag.

When receiving the user information of the STB 101 reported by the vBRAS 501, the vBRASSO 600 may record the received user information of the STB 101 and the information of the vBRAS 501 reporting the user information (for example, the identifier of the vBRAS 501), which may be specifically as shown in Table 1.

TABLE 1

| vBRAS identifier | IP address | MAC address | Inner-layer VLAN tag | Outer-layer VLAN tag |
|---|---|---|---|---|
| vBRAS 501 | 10.1.1.1 | 78-AC-C0-9D-04-11 | 2000 | 2000 |

The vBRASSO 600 may determine the POP switch used subsequently to forward the video-on-demand flow to the STB 101 based on the inner-layer VLAN tag and the outer-layer VLAN tag in the user information shown in Table 1.

In this example, the vBRASSO 600 is responsible for configuring a VLAN supported by each user-side port on each POP switch. The VLAN supported by the user-side port may include an inner network VLAN and an outer network VLAN. An identifier corresponding to the inner network VLAN may be an inner-layer VLAN tag, and an identifier corresponding to the outer network VLAN may be an outer-layer VLAN tag. After each POP switch is configured, combinations of inner-layer VLAN tags and outer-layer VLAN tags supported by different user-side ports of different POP switches are different, and combinations of inner-layer VLAN tags and outer-layer VLAN tags supported by different user-side ports of a same POP switch are also different.

In this example, the vBRASSO 600 may locally record a network configuration of each POP switch to facilitate a query. For example, the vBRASSO 600 may locally record the identifier of the VLAN supported by each user-side port of each POP switch, including an identifier corresponding to the inner network VLAN, i.e. the inner-layer VLAN tag, and an identifier corresponding to the outer network VLAN, i.e., the outer-layer VLAN tag. The network configuration here may be, for example, an Access Circuit (AC) configuration.

Based on this, the vBRASSO 600 may obtain a matched network configuration from the locally-recorded network configurations of different POP switches based on the inner-layer VLAN tag and the outer-layer VLAN tag in the user information shown in Table 1, and determine a POP switch with the matched network configuration as a POP switch for forwarding the video-on-demand flow to the STB 101. Since different user-side ports of different POP switches support different VLANs, the POP switch determined by the vBRASSO 600 based on the inner-layer VLAN tag and the outer-layer VLAN tag in the user information shown in Table 1 will be unique and the determined unique POP switch may be further determined as a POP switch subsequently used to forward the video-on-demand flow to the STB 101. In this example, the POP switch is the POP switch 401.

Thus, the vBRASSO 600 may notify the POP switch 401 of a route for forwarding the video-on-demand flow to the STB 101. In an example, the vBRASSO 600 may send the route for forwarding the video-on-demand flow to the STB 101 to the POP switch 401 through a network configuration (Netconf) channel.

In an example, the route for forwarding the video-on-demand flow to the STB 101 may be a network segment route of the video-on-demand address pool corresponding to the vBRAS 501. In the present disclosure, the vBRASSO 600 is responsible for service configurations of different vBRASs. Therefore, the vBRASSO 600 may determine the network segment route of the video-on-demand address pool corresponding to the vBRAS 501 based on the service configuration of the vBRAS 501. As described above, the video-on-demand address pool corresponding to the vBRAS 501 may include the above IP address of the STB 101. Therefore, the network segment route of the video-on-demand address pool corresponding to the vBRAS 501 may be considered as a route for forwarding the video-on-demand flow to the STB 101.

In another example, the route for forwarding the video-on-demand flow to the STB 101 may be the host route of the STB 101.

The vBRASSO 600 may send a forwarding entry for forwarding the video-on-demand flow to the STB 101 to the POP switch 401, where the forwarding entry may include a matching item and an action item.

The matching item may be that the destination IP address of the video-on-demand flow is the IP address of the STB 101.

The action item may include performing Ethernet encapsulation for a video-on-demand flow matched with the matching item and forwarding the Ethernet-encapsulated video-on-demand flow via a designated port on the POP switch 401. In this way, the POP switch 401 may send the Ethernet-encapsulated video-on-demand flow to the STB 101 as described below.

Here, a source MAC address in the Ethernet encapsulation is the MAC address of the POP switch 401, and a destination MAC address in the Ethernet encapsulation is the MAC address of the STB 101. In addition, the Ethernet encapsulation may also include the inner-layer VLAN tag and the outer-layer VLAN tag in the user information shown in the above Table 1.

The designated port here may be a user-side port on the POP switch 401, the port supporting an inner network VLAN corresponding to the inner-layer VLAN tag shown in the user information in Table 1 and an outer network VLAN corresponding to the outer-layer VLAN tag shown in the user information in Table 1. As described above, in this example, combinations of inner-layer VLAN tags and outer-layer VLAN tags supported by different user-side ports of a same POP switch are different. Therefore, the designated port may be uniquely determined based on the inner-layer VLAN tag and the outer-layer VLAN tag in the user information shown in Table 1.

When receiving the above route for forwarding the video-on-demand flow to the STB 101, the POP switch 401 may advertise the route for forwarding the video-on-demand flow to the STB 101 to a CR 800 based on a routing protocol. That is, in the present disclosure, the POP switch 401 instead of the vBRAS 501 may advertise the route for forwarding the video-on-demand flow to the STB 101 to the CR 800. In this way, the CR 800 can subsequently send the video-on-demand flow to the STB 101 based on the route, that is, the CR 800 can send the video-on-demand flow to the POP switch 401 rather than to the vBRAS 501, thereby allowing the POP switch 401 to forward the video-on-demand flow as described below.

Afterwards, as shown in FIG. 2, when the CR 800 sends a video-on-demand flow to the STB 101, that is, receives a video-on-demand flow with a destination IP address as the IP address of the STB 101, the CR 800 may forward the video-on-demand flow sent to the STB 101 to the POP switch 401 based on the previously-learned route for forwarding the video-on-demand flow to the STB 101.

After receiving the video-on-demand flow sent to the STB 101, the POP switch 401 may encapsulate the MAC address of the STB 101, the inner-layer VLAN tag and the outer-layer VLAN tag in the user information shown in the above Table 1 for the video-on-demand flow based on the above forwarding entry. Then, the POP switch 401 may send the encapsulated video-on-demand flow via a designated port in the above forwarding entry, i.e., a user-side port determined based on the inner-layer VLAN tag and the outer-layer VLAN tag in the user information shown in above Table 1. In this way, the video-on-demand flow will eventually be sent to the STB 101.

Thus, the description of the example shown in FIG. 2 is completed.

In another example, an Openflow switch may be not included in, but a POP switch may be included in a broadband virtual network applied in the present disclosure. In the network, to authenticate the second user by the vBRAS in the vBRAS resource pool, the vBRASSO may send a VXLAN tunnel configuration to any POP switch (referred to as a second POP switch) in the network to instruct the second POP switch to establish a VXLAN tunnel with at least one vBRAS in the vBRAS resource pool managed by the vBRASSO. Thus, the second POP switch may send a received first user control packet from the second user to a corresponding vBRAS through the established VXLAN tunnel, and may determine a vBRAS to interact with the second user to complete the authentication of the second user based on the responses of different vBRASSs to the first user control packet.

Figure 3:
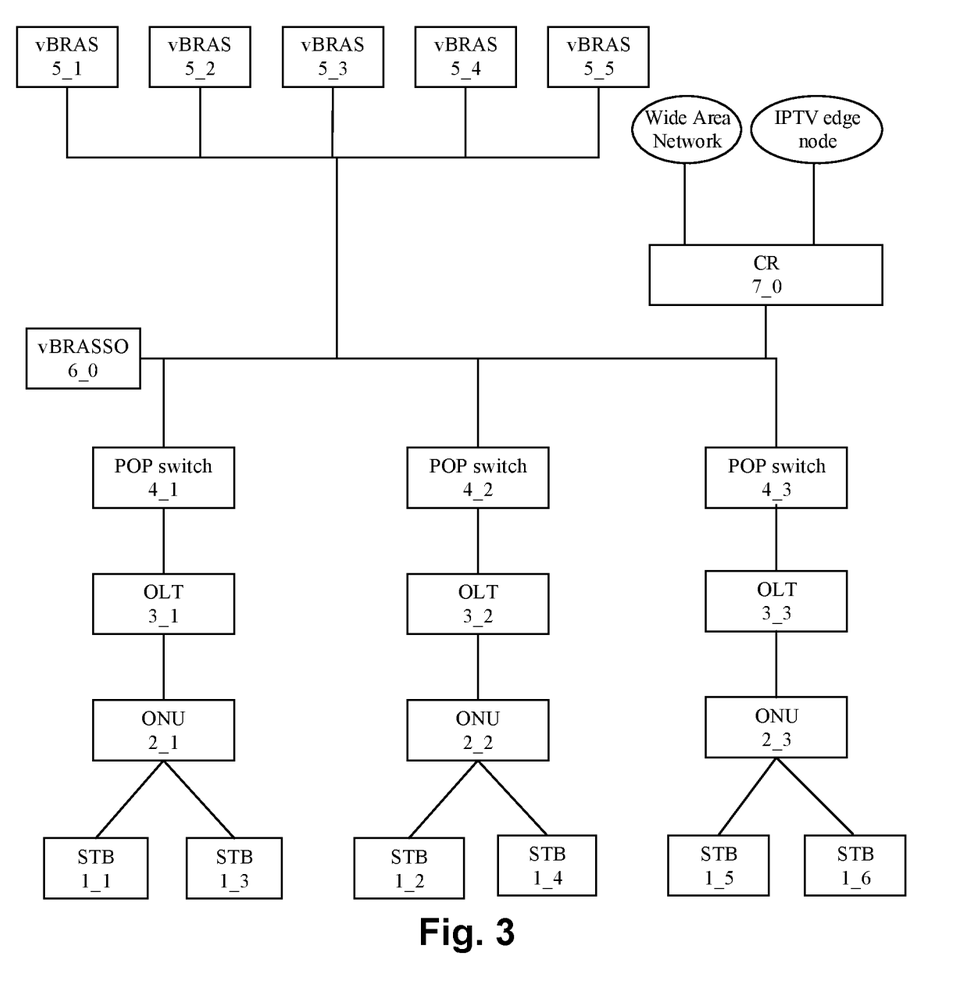
FIG. 3 is a schematic diagram illustrating a second application network based on an example of the present disclosure.

FIG. 3 is a schematic diagram illustrating a second application network based on an example of the present disclosure. Only three POP switches 4_1, 4_2, 4_3 are exemplified in the broadband virtual network shown in FIG. 3.

In FIG. 3, a vBRASSO 6_0 manages a vBRAS resource pool shown in FIG. 3, and the vBRAS resource pool may include five vBRASSs 5_1-5_5. Each of the five vBRASSs 5_1-5_5 in the vBRAS resource pool establishes a data channel with the vBRASSO 6_0.

In FIG. 3, the vBRASSO 6_0 may send a VXLAN tunnel configuration to each of POP switches 4_1, 4_2, 4_3 to instruct each of the POP switches 4_1, 4_2, 4_3 to establish a VXLAN tunnel with each of the vBRASSs 5_1-5_5. In an example, one POP switch may establish VXLAN tunnels with a plurality of vBRASSs.

In FIG. 3, it is assumed that the POP switch 4_1 establishes VXLAN tunnels with both vBRAS 5_1 and vBRAS 5_2. The VXLAN tunnel established between the POP switch 4_1 and the vBRAS 5_1 may be denoted as a first VXLAN tunnel. The VXLAN tunnel established between the POP switch 4_1 and the vBRAS 5_2 may be denoted as a second VXLAN tunnel. Moreover, VXLAN identifiers corresponding to the first VXLAN tunnel and the second VXLAN tunnel are same for example, 100, so that the POP switch 4_1 can send a received broadcast packet to the vBRAS 5_1 and the vBRAS 5_2 through the two VXLAN tunnels.

The POP switch 4_2 establishes VXLAN tunnels with both the vBRAS 5_3 and the vBRAS 5_4. The VXLAN tunnel established between the POP switch 4_2 and the vBRAS 5_3 may be denoted as a third VXLAN tunnel. The VXLAN tunnel established between the POP switch 4_2 and the vBRAS 5_4 may be denoted as a fourth VXLAN tunnel. Moreover, VXLAN identifiers corresponding to the third VXLAN tunnel and the fourth VXLAN tunnel are same, for example, 200, so that the POP switch 4_2 can send a received broadcast packet to the vBRAS 5_3 and the vBRAS 5_4 through the two VXLAN tunnels.

The POP switch 4_3 establishes a VXLAN tunnel with the vBRAS 5_5. The VXLAN tunnel established between the POP switch 4_3 and the vBRAS 55 may be denoted as a fifth VXLAN tunnel, and a VXLAN identifier of the fifth VXLAN tunnel may be denoted as 300.

Taking a user STB 1_3 shown in FIG. 3 going online as an example, other users such as a STB 1_1, an STB 1_2, and a STB 1_4 to STB 1_6 shown in FIG. 3 are similar, which will not be described.

The STB 1_3 may broadcast a user control packet (for example, a DHCP control packet) when needing to go online. A destination MAC address of the user control packet is a designated broadcast address, and a source MAC address of the user control packet is the MAC address of the STB 1_3 (for example, 78-AC-C0-9D-04-13). For convenience of description, herein, the user control packet is denoted as packet A.

When receiving the packet A from the STB 1_3, an ONU 2_1 may add an inner-layer VLAN tag to the packet A. Here, it is assumed that the added inner-layer VLAN tag is 2000. For convenience of description, a packet obtained by adding the inner-layer VLAN tag to the packet A is denoted as a packet B here. Further, the ONU 2_1 may forward the packet B to an OLT 3_1.

When receiving the packet B, the OLT 3_1 may add an outer-layer VLAN tag to the packet B. Here, it is assumed that the added outer-layer VLAN tag is 2000. For convenience of description, a packet obtained by adding the outer-layer VLAN tag to the packet B is denoted as a packet C here. Further, the OLT 3_1 may forward the packet C to the POP switch 4_1.

When receiving the packet C, the POP switch 4_1 may identify that the packet C is a first user control packet of the STB 1_3, and check that the POP switch 4_1 establishes VXLAN tunnels with the vBRAS 5_1 and the vBRAS 5_2. VXLAN identifiers respectively corresponding to the first VXLAN tunnel established between the POP switch 4_1 and the vBRAS 51 and the second VXLAN tunnel established between the POP switch 4_1 and the vBRAS 5_2 are both 100.

The POP switch 4_1 may acquire encapsulation information corresponding to the first VXLAN tunnel based on the VXLAN identifier 100, obtain a packet D1 by performing VXLAN encapsulation on the packet C based on the encapsulation information, and then send the packet D1 through the first VXLAN tunnel. The VXLAN identifier in the VXLAN encapsulation of the packet D1 is 100.

The POP switch 4_1 may also acquire encapsulation information corresponding to the second VXLAN tunnel based on the VXLAN identifier 100, obtain a packet D2 by performing VXLAN encapsulation on the packet C based on the encapsulation information, and then send the packet D2 through the second VXLAN tunnel. The VXLAN identifier in the VXLAN encapsulation of the packet D2 is 100.

After receiving the VXLAN-encapsulated packet D1 through the first VXLAN tunnel, the vBRAS 5_1 may return a first response packet to the STB 1_3. Similarly, after receiving the VXLAN-encapsulated packet D2 through the second VXLAN tunnel, the vBRAS 5_2 may return a second response packet to the STB 1_3.

The vBRAS sending a response packet to the STB 1_3 first may be determined as a vBRAS for authenticating the STB 1_3. For example, it is assumed that the POP switch 4_1 first receives the first response packet returned by the vBRAS 5_1 to the STB 1_3, and then receives the second response packet returned by the vBRAS 5_2 to the STB 1_3. Although the POP switch 4_1 may forward both the first response packet and the second response packet to the STB 1_3, the STB 1_3 only receives the first response packet, and accordingly may determine the vBRAS 5_1 as the vBRAS for authenticating the STB 1_3. In this way, the POP switch 4_1 may learn and record a correspondence between the vBRAS 5_1 and the STB 1_3. Afterwards, the STB 1_3 may interact with the vBRAS 5_1 so that the vBRAS 5_1 can complete the authentication of the STB 1_3.

After completing the authentication of the STB 1_3, the vBRAS 5_1 may select an idle IP address from a video-on-demand address pool corresponding to the vBRAS 5_1 and assign the idle IP address to the STB 1_3 so that the STB 1_3 may interact with the vBRAS 5_1 based on the assigned IP address to complete the establishment of a session, etc., thus enabling the STB 1_3 to go online.

It is noted that, during the interaction between the vBRAS 5_1 and the STB 1_3, the STB 1_3 may also send user control packets. In this case, when receiving another user control packet from the STB 1_3, the POP switch 41 may directly send the user control packet to the vBRAS 5_1 rather than to the vBRAS 5_2 through the first VXLAN tunnel with the VXLAN identifier as 100 based on the above-recorded correspondence between the vBRAS 5_1 and the STB 1_3. That is, in the present disclosure, even if a POP switch establishes VXLAN tunnels with a plurality of vBRASs, only the first user control packet of the user can be sent to the plurality of vBRASs, and other user control packets of the user will be subsequently sent to a particular vBRAS.

The vBRAS 5_1 may report the user information of the STB 1_3 to the vBRASSO 6_0 through the data channel established between the vBRAS 5_1 and the vBRASSO 6_0. The user information of the STB 1_3 may include: the IP address (for example, 10.3.3.3) and the MAC address (for example, 78-AC-C0-9D-04-13) of the STB 1_3, and a network identifier encapsulated in the user control packet received by the vBRAS 5_1 from the STB 1_3. The network identifier herein may include an inner-layer VLAN tag, an outer-layer VLAN tag, and a VXLAN identifier.

When receiving the user information of the STB 1_3 reported by the vBRAS 5_1, the vBRASSO 6_0 may record the received user information of the STB 1_3 and the information of the vBRAS 5_1 reporting the user information (for example, the identifier of the vBRAS 5_1), which may be specifically as shown in Table 2.

TABLE 2

| vBRAS identifier | IP address | MAC address | Inner-layer VLAN tag | Outer-layer VLAN tag | VXLAN identifier |
|---|---|---|---|---|---|
| vBRAS 5_1 | 10.3.3.3 | 78-AC-C0-9D-04-13 | 2000 | 2000 | 100 |

The vBRASSO 6_0 may determine a POP switch subsequently used to forward a video-on-demand flow to the STB 1_3 based on the inner-layer VLAN tag, the outer-layer VLAN tag, and the VXLAN identifier in the user information shown in Table 2.

In this example, the vBRASSO 6_0 is responsible for configuring VXLANs supported by user-side ports on POP switches. The vBRASSO 6_0 may configure an inner network VLAN, an outer network VLAN, and a VXLAN for a user-side port of the POP switch. An identifier corresponding to the inner network VLAN may be the inner-layer VLAN tag, an identifier corresponding to the outer network VLAN may be the outer-layer VLAN tag, and an identifier corresponding to the VXLAN may be the VXLAN identifier. After each POP switch is configured, the VLANs supported by different user-side ports of a same POP switch are different and VXLANs corresponding to different POP switches are also different.

In this example, the vBRASSO 6_0 may locally record network configurations of different POP switches to facilitate a query. For example, the vBRASSO 6_0 may locally record at least a VXLAN identifier of a VXLAN tunnel between a POP switch and a vBRAS, and identifiers of VLANs supported by user-side ports on the POP switch. The identifier of the VLAN supported by the user-side port on the POP switch may include an identifier corresponding to the inner network VLAN (i.e., the inner-layer VLAN tag), and an identifier corresponding to the outer network VLAN (i.e., the outer-layer VLAN tag). The network configuration here may be, for example, an Access Circuit (AC) configuration. In this example, the VLANs supported by the user-side ports of different POP switches may be same, but it should be ensured that the VXLAN identifiers included in the network configurations of different POP switches are different and VLANs supported by different user-side ports of a same POP switch are also different. In this way, it is guaranteed that combinations of the inner-layer VLAN tag, the outer-layer VLAN tag and VXLAN identifier included in the network configurations corresponding to different user-side ports of different POP switches are different.

Based on this, the vBRASSO 6_0 may obtain a matched network configuration from the locally-recorded network configurations of the POP switches based on the VXLAN identifier in the user information shown in Table 2, and determine a POP switch with the matched network configuration as a POP switch for forwarding the video-on-demand flow to the STB 1_3. Because the VXLAN identifiers in the network configurations of different POP switches are different, the POP switch determined by the vBRASSO 6_0 based on the VXLAN identifiers in the user information shown in Table 2 will be unique and the determined unique POP switch may be further determined as a POP switch subsequently used to forward the video-on-demand flow to the STB 1_3. In this example, the POP switch is the POP switch 4_1.

Thus, the vBRASSO 6_0 may notify the POP switch 4_1 of the route for forwarding the video-on-demand flow to the STB 1_3. In an example, the vBRASSO 60 may send the route for forwarding the video-on-demand flow to the STB 1_3 to the POP switch 4_1 through a network configuration (Netconf) channel.

In an example, the route for forwarding the video-on-demand flow to the STB 1_3 here may be a network segment route of the video-on-demand address pool corresponding to the vBRAS 5_1. In the present disclosure, the vBRASSO 6_0 is responsible for service configuration of each vBRAS. Therefore, the vBRASSO 6_0 may determine the network segment route of the video-on-demand address pool corresponding to the vBRAS 5_1 based on the service configuration of the vBRAS 5_1. As described above, the video-on-demand address pool corresponding to the vBRAS 5_1 may include the IP address of the STB 1_3 described above. Therefore, the network segment route of the video-on-demand address pool corresponding to the vBRAS 5_1 may be considered as a route for forwarding the video-on-demand flow to the STB 1_3.

In another example, the route for forwarding the video-on-demand flow to the STB 1_3 here may be a host route of the STB 1_3.

The vBRASSO 6_0 may send a forwarding entry for forwarding the video-on-demand flow to the STB 1_3 to the POP switch 4_1, where the forwarding entry may include a matching item and an action item.

The matching item may be that a destination IP address of the video-on-demand flow is an IP address of the STB 1_3.

The action item may include performing Ethernet encapsulation for a video-on-demand flow matched with the matching item and forwarding the Ethernet-encapsulated video-on-demand flow via a designated port on the POP switch 4_1. In this way, the POP switch 4_1 may send the Ethernet-encapsulated video-on-demand flow to the STB 1_3 as described below.

A source MAC address in the Ethernet encapsulation is an MAC address of the POP switch 4_1, and a destination MAC address in the Ethernet encapsulation is an MAC address of the STB 1_3 here. In addition, the Ethernet encapsulation may also include the inner-layer VLAN tag and the outer-layer VLAN tag in the user information shown in the above Table 2.

The designated port here may be a user-side port on the POP switch 4_1, the port supporting the inner network VLAN corresponding to the inner-layer VLAN tag in the user information, the outer network VLAN corresponding to the outer-layer VLAN tag and the VXLAN corresponding to the VXLAN identifier in the user information shown in Table 2. As described above, in this example, the inner-layer VLAN and the outer-layer VLAN supported by different user-side ports of a same POP switch are different but correspond to a same VXLAN identifier, and the VLXAN identifiers corresponding to different POP switches are different. Therefore, the designated port may be uniquely determined based on the combination of the inner-layer VLAN tag, the outer-layer VLAN tag and the VXLAN identifier in the user information shown in Table 2.

When receiving the above route for forwarding the video-on-demand flow to the STB 1_3, the POP switch 4_1 may advertise the route for forwarding the video-on-demand flow to the STB 1_3 to a CR 7_0 based on a routing protocol. That is, in the present disclosure, the POP switch 4_1 instead of the vBRAS 5_1 may advertise the route for forwarding the video-on-demand flow to the STB 1_3 to the CR 7_0. In this way, the CR 7_0 may send the video-on-demand flow to be sent to the STB 1_3 to the POP switch 4_1 rather than to the vBRAS 5_1 based on the route for forwarding the video-on-demand flow to the STB 1_3, thereby allowing the POP switch 41 to effectively forward the video-on-demand flow as described below.

Afterwards, as shown in FIG. 3, when the CR 7_0 sends a video-on-demand flow to the STB 1_3, that is, receives a video-on-demand flow with a destination IP address as the IP address of the STB 1_3, the CR 7_0 may forward the video-on-demand flow to be sent to the STB 1_3 to the POP switch 4_1 based on the previously-learned route for forwarding the video-on-demand flow to the STB 1_3.

After receiving the video-on-demand flow to be sent to the STB 1_3, the POP switch 4_1 may encapsulate the MAC address of the STB 1_3, and the inner-layer VLAN tag and the outer-layer VLAN tag in the user information shown in Table 2 described above for the video-on-demand flow based on the above forwarding entry. Then, the POP switch 4_1 may send the encapsulated video-on-demand flow through a designated port in the above forwarding entry, i.e., a user-side port determined based on the combination of the inner-layer VLAN tag, the outer-layer VLAN tag and the VXLAN identifier in the user information shown in Table 2 described above. In this way, the video-on-demand flow will eventually be sent to the STB 1_3.

Thus, the description of the example of the network shown in FIG. 3 is completed.

Figure 4:
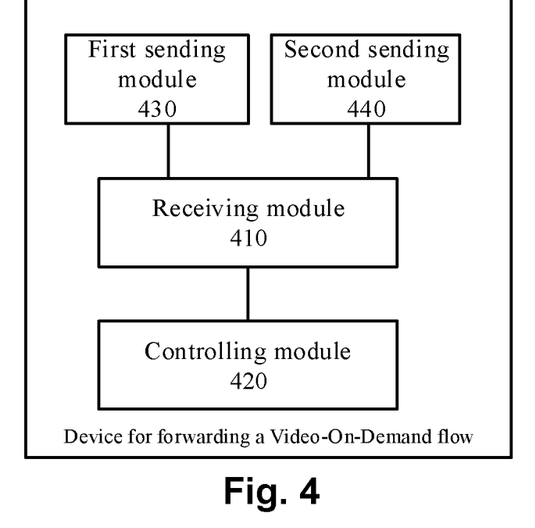
FIG. 4 is a schematic diagram illustrating a structure of a device based on an example of the present disclosure.

FIG. 4 is a schematic diagram illustrating a functional structure of a device for forwarding a video-on-demand flow based on an example of the present disclosure. The device may be applied to a Virtual Broadband Remote Access Server (vBRAS) Service Orchestrator (vBRASSO) in a network with virtualization of network functions. The vBRASSO is configured to manage a vBRAS resource pool in the network with virtualization of network functions. As shown in FIG. 4, the device may include a receiving module 410 and a controlling module 420.

The receiving module 410 may be configured to receive user information from a vBRAS in the vBRAS resource pool, where the user information is user information of a first user successfully authenticated on the vBRAS.

The controlling module 420 may be configured to determine a first Point Of Presence (POP) switch for forwarding a video-on-demand flow to the first user based on the user information and notify the first POP switch of a route for forwarding a video-on-demand flow to the first user. In this way, the first POP switch may advertise the route to a Core Router (CR) in a network with virtualization of network functions, where the CR is configured to receive the video-on-demand flow from a video-playing source.

In an example, the device may further include a first sending module 430 configured to send a flow entry to an Openflow switch in the network with virtualization of network functions to instruct the Openflow switch to send a first user control packet from a second user to the vBRASSO.

In this case, when receiving the first user control packet sent by the Openflow switch based on the flow entry, the receiving module 410 may select one vBRAS from the vBRAS resource pool managed by the vBRASSO based on a load balancing principle, and forward the first user control packet to the selected vBRAS, so that the selected vBRAS authenticates the second user.

The controlling module 420 may be configured to find a POP switch satisfying a preset condition from all the POP switches in the network with virtualization of network functions based on the user information, and determine the found POP switch as the first POP switch for forwarding a video-on-demand flow to the first user, where the preset condition may be that the network configuration of the first POP switch includes a network identifier in the user information and the network identifier includes an inner-layer VLAN tag and an outer-layer VLAN tag.

The controlling module 420 may be further configured to send a forwarding entry to the first POP switch, where the forwarding entry includes a matching item and an action item. The matching item may be that a destination IP address of the video-on-demand flow is an IP address in the user information. The action item may be that Ethernet encapsulation is performed for the video-on-demand flow matched with the matching item, and the Ethernet-encapsulated video-on-demand flow is forwarded through a designated port on the first POP switch. A destination MAC address in the Ethernet encapsulation is an MAC address in the user information, and a source MAC address in the Ethernet encapsulation is an MAC address of the first POP switch. In addition, the Ethernet encapsulation may further include an inner-layer VLAN tag and an outer-layer VLAN tag in the user information. The designated port is a user-side port on the first POP switch, the port supporting an inner network VLAN corresponding to the inner-layer VLAN tag and an outer network VLAN corresponding to the outer-layer VLAN tag in the user information.

In an example, the device may further include a second sending module 440 configured to send a VXLAN tunnel configuration to a second POP switch in the network with virtualization of network functions to instruct the second POP switch to establish a VXLAN tunnel with at least one vBRAS in the vBRAS resource pool. In this way, the second POP switch may send the first user control packet from the second user to the corresponding vBRAS through the established VXLAN tunnel, and determine the vBRAS for authenticating the second user based on a response of each vBRAS to the first user control packet.

In an example, the controlling module 420 may be configured to determine a POP switch with a network configuration matched with a network identifier in the user information in the network with virtualization of network functions as the first POP switch for forwarding a video-on-demand flow to the first user; the network identifier comprises: an inner-layer VLAN tag and an outer-layer VLAN tag.

In an example, the controlling module 420 may be configured to determine a POP switch with a network configuration matched with a VXLAN identifier included in a network identifier in the user information in the network with virtualization of network functions as the first POP switch for forwarding a video-on-demand flow to the first user; the network identifier further comprises: an inner-layer VLAN tag, and an outer-layer VLAN tag.

The controlling module 420 may be further configured to send a forwarding entry to the first POP switch, where the forwarding entry includes a matching item and an action item. The matching item may be that the destination IP address of the video-on-demand flow is an IP address in the user information. The action item may be that Ethernet encapsulation is performed for the video-on-demand flow matched with the matching item, and the Ethernet-encapsulated video-on-demand flow is forwarded through a designated port on the first POP switch. A destination MAC address in the Ethernet encapsulation is the MAC address in the user information, and a source MAC address in the Ethernet encapsulation is the MAC address of the first POP switch. In addition, the Ethernet encapsulation may further include an inner-layer VLAN tag and an outer-layer VLAN tag in the user information. The designated port is a user-side port supporting a network identifier in the user information on the first POP switch.

Thus, the description of the structure of the device shown in FIG. 4 is completed.

Figure 5:
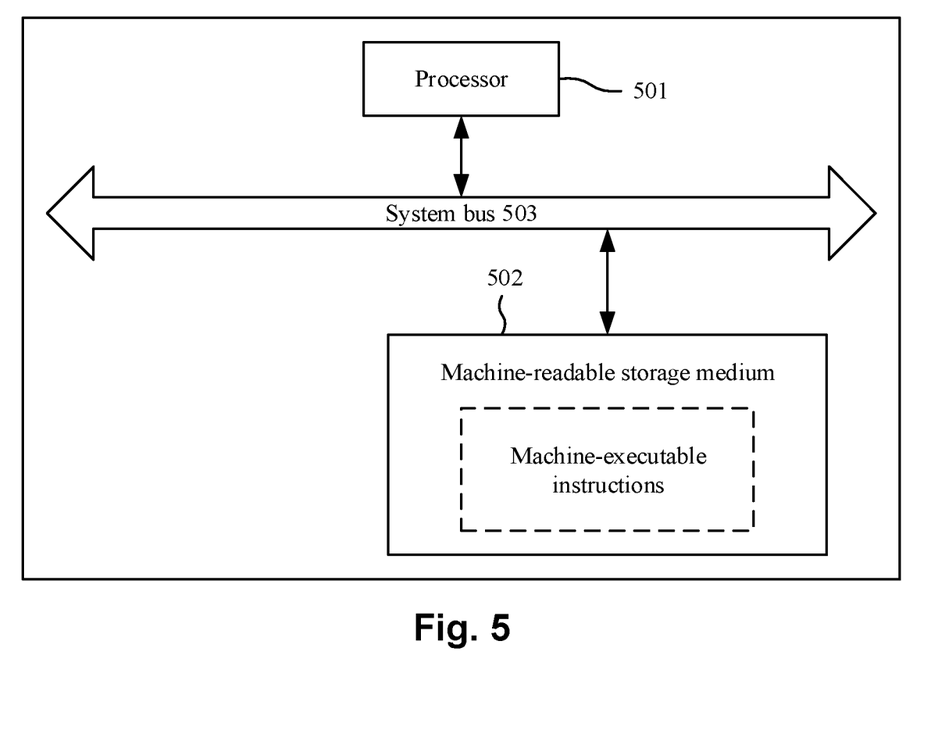
FIG. 5 is a schematic diagram illustrating a hardware structure of a device based on an example of the present disclosure.

Correspondingly, the present disclosure further provides a schematic diagram illustrating a hardware structure of the device shown in FIG. 4. As shown in FIG. 5, the hardware structure may include a processor 501 and a machine-readable storage medium 502 storing machine-executable instructions. The processor 501 may communicate with the machine-readable storage medium 502 via a system bus 503. Moreover, by reading and executing the machine-executable instructions corresponding to a logic for forwarding a video-on-demand flow in the machine-readable storage medium 502, the processor 501 may be caused to execute the above method of forwarding a video-on-demand flow.

The machine-readable storage medium 502 mentioned herein may be any of electronic, magnetic, optical, or other physical storage devices and may contain or store information such as executable instructions, data, etc. For example, the machine-readable storage medium may be a volatile memory, a non-volatile memory, or a similar storage medium. Specifically, the machine-readable storage medium may be: a Radom Access Memory (RAM), a flash memory, a storage drive (e.g. a hard disk drive), a solid state hard disk, any type of storage disks (e.g., an optical disk, a Digital Video Disk (DVD)), or a combination thereof.

Thus, the description of the hardware structure shown in FIG. 5 is completed.

In the present disclosure, there is further provided a machine-readable storage medium including machine-executable instructions, for example, the machine-readable storage medium 502 in FIG. 5. The machine-executable instructions may be executed by the processor 501 in the device for forwarding a video-on-demand flow to implement the above method of forwarding a video-on-demand flow.

Specifically, by invoking and executing the machine-executable instructions corresponding to the logic for forwarding a video-on-demand flow in the machine-readable storage medium, the processor 501 may perform the operations in the above method of forwarding a video-on-demand flow.

The foregoing disclosure is merely illustrative of preferred examples of the present disclosure but is not intended to limit the present disclosure, and any modifications, equivalent substitutions, adaptations thereof made within the spirit and scope of the present disclosure shall be encompassed in the claimed scope of the present disclosure.

The invention claimed is:

1. A method of forwarding a video-on-demand flow, comprising:
    receiving, by a Virtual Broadband Remote Access Server vBRAS Service Orchestrator vBRASSO in a network with virtualization of network functions, user information from a vBRAS in a vBRAS resource pool, wherein the user information is user information of a first user successfully authenticated on the vBRAS;
    determining, by the vBRASSO, a first Point Of Presence POP switch for forwarding a video-on-demand flow to the first user based on the user information;
    notifying, by the vBRASSO, the first POP switch of a route for forwarding the video-on-demand flow to the first user in such a way that the first POP switch advertises the route to a Core Router CR in the network with virtualization of network functions, wherein the CR is configured to receive the video-on-demand flow from a video-playing source,
    sending, by the vBRASSO, a forwarding entry to the first POP switch,
    wherein the forwarding entry comprises:
        a matching item in which a destination IP address of the video-on-demand flow is an IP address in the user information,
        an action item in which Ethernet encapsulation is performed for the video-on-demand flow matched with the matching item, and the Ethernet-encapsulated video-on-demand flow is forwarded through a user-side port that is on the first POP switch and matched with a network identifier in the user information,
        a destination MAC address in the Ethernet encapsulation is an MAC address in the user information,
        a source MAC address in the Ethernet encapsulation is an MAC address of the first POP switch, and
        the Ethernet encapsulation further comprises an inner-layer VLAN tag and an outer-layer VLAN tag in the network identifier.

2. The method according to claim 1, further comprising:
    sending, by the vBRASSO, a flow entry to an Openflow switch in the network with virtualization of network functions, wherein the flow entry is configured to instruct the Openflow switch to send a first user control packet from a second user to the vBRASSO;

selecting, by the vBRASSO, a vBRAS for authenticating the second user from the vBRAS resource pool based on a load balancing principle, when the vBRASSO receives the first user control packet sent by the Openflow switch based on the flow entry;

forwarding, by the vBRASSO, the first user control packet to the vBRAS for authenticating the second user.

3. The method according to claim 1, further comprising:

sending, by the vBRASSO, a VXLAN tunnel configuration to a second POP switch in the network with virtualization of network functions, wherein the VXLAN tunnel configuration is to instruct the second POP switch to establish a VXLAN tunnel with at least one vBRAS in the vBRAS resource pool in such a way that the second POP switch sends a first user control packet from a second user to the at least one vBRAS through the established VXLAN tunnel, and determines a vBRAS for authenticating the second user based on a response of each of the at least one vBRAS to the first user control packet.

4. The method according to claim 1, wherein determining the first POP switch for forwarding a video-on-demand flow to the user based on the user information comprises:

determining, by the vBRASSO, a POP switch with a network configuration matched with a network identifier in the user information in the network with virtualization of network functions as the first POP switch for forwarding a video-on-demand flow to the first user;

the network identifier comprises: an inner-layer VLAN tag and an outer-layer VLAN tag.

5. The method according to claim 1, wherein determining the first POP switch for forwarding a video-on-demand flow to the user based on the user information comprises:

determining, by the vBRASSO, a POP switch with a network configuration matched with a VXLAN identifier included in a network identifier in the user information in the network with virtualization of network functions as the first POP switch for forwarding a video-on-demand flow to the first user;

the network identifier further comprises: an inner-layer VLAN tag, and an outer-layer VLAN tag.

6. A Virtual Broadband Remote Access Server vBRAS Service Orchestrator vBRASSO in a network with virtualization of network functions, comprising:

a non-transitory machine-readable storage medium storing machine-readable instructions;

a processor configured to execute the machine-readable instructions to receive user information from a vBRAS in a vBRAS resource pool, wherein the user information is user information of a first user successfully authenticated on the vBRAS;

determine a first Point Of Presence POP switch for forwarding a video-on-demand flow to the first user based on the user information;

notify the first POP switch of a route for forwarding the video-on-demand flow to the first user in such a way that the first POP switch advertises the route to a Core Router CR in the network with virtualization of network functions, wherein the CR is configured to receive the video-on-demand flow from a video-playing source, send a forwarding entry to the first POP switch, wherein the forwarding entry comprises:

a matching item in which a destination IP address of the video-on-demand flow is an IP address in the user information, an action item in which Ethernet encapsulation is performed for the video-on-demand flow matched with the matching item, and the Ethernet-encapsulated video-on-demand flow is forwarded through a user-side port that is on the first POP switch and matched with a network identifier in the user information, a destination Media Access Control MAC address in the Ethernet encapsulation is an MAC address in the user information, a source MAC address in the Ethernet encapsulation is an MAC address of the first POP switch, and the Ethernet encapsulation further comprises an inner-layer VLAN tag and an outer-layer VLAN tag in the network identifier.

7. The vBRASSO in a network with virtualization of network functions according to claim 6, wherein the processor is further caused by the machine-executable instructions to:

send a flow entry to an Openflow switch in the network with virtualization of network functions, wherein the flow entry is configured to instruct the Openflow switch to send a first user control packet from a second user to the vBRASSO;

select a vBRAS for authenticating the second user from the vBRAS resource pool based on a load balancing principle when receiving the first user control packet sent by the Openflow switch based on the flow entry, and forward the first user control packet to the vBRAS for authenticating the second user.

8. The vBRASSO in a network with virtualization of network functions according to claim 6, wherein the processor is further caused by the machine-executable instructions to:

send a VXLAN tunnel configuration to a second POP switch in the network with virtualization of network functions, wherein the VXLAN tunnel configuration is to instruct the second POP switch to establish a VXLAN tunnel with at least one vBRAS in the vBRAS resource pool in such a way that the second POP switch sends a first user control packet from a second user to the at least one vBRAS through the established VXLAN tunnel, and determines a vBRAS for authenticating the second user based on a response of each of the at least one vBRAS to the first user control packet.

9. The vBRASSO in a network with virtualization of network functions according to claim 6, wherein when determining the first POP switch for forwarding a video-on-demand flow to the user based on the user information, the processor is caused by the machine-executable instructions to:

determine a POP switch with a network configuration matched with a network identifier in the user information in the network with virtualization of network functions as the first POP switch for forwarding a video-on-demand flow to the first user;

the network identifier comprises: an inner-layer VLAN tag and an outer-layer VLAN tag.

10. The vBRASSO in a network with virtualization of network functions according to claim 6, wherein when determining the first POP switch for forwarding a video-ondemand flow to the user based on the user information, the processor is caused by the machine-executable instructions to:
    determine a POP switch with a network configuration matched with a VXLAN identifier included in a network identifier in the user information in the network with virtualization of network functions as the first POP switch for forwarding a video-on-demand flow to the first user;
    the network identifier further comprises: an inner-layer VLAN tag, and an outer-layer VLAN tag.

11. A device for forwarding a video-on-demand flow, the device being applied to a Virtual Broadband Remote Access Server vBRAS Service Orchestrator vBRASSO in a network with virtualization of network functions, comprising:
    a processor, and
    a non-transitory machine-readable storage medium storing machine-executable instructions executable by the processor, wherein the processor is caused by the machine-executable instructions to:
        receive user information from a vBRAS in a vBRAS resource pool, wherein the user information is user information of a first user successfully authenticated on the vBRAS;
        determine a first Point Of Presence POP switch for forwarding a video-on-demand flow to the first user based on the user information;
        notify the first POP switch of a route for forwarding the video-on-demand flow to the first user in such a way that the first POP switch advertises the route to a Core Router CR in the network with virtualization of network functions, wherein the CR is configured to receive the video-on-demand flow from a video-playing source,
        send a forwarding entry to the first POP switch,
    wherein the forwarding entry comprises:
        a matching item in which a destination IP address of the video-on-demand flow is an IP address in the user information,
        an action item in which Ethernet encapsulation is performed for the video-on-demand flow matched with the matching item, and the Ethernet-encapsulated video-on-demand flow is forwarded through a user-side port that is on the first POP switch and matched with a network identifier in the user information,
        a destination Media Access Control MAC address in the Ethernet encapsulation is an MAC address in the user information,
        a source MAC address in the Ethernet encapsulation is an MAC address of the first POP switch, and
        the Ethernet encapsulation further comprises an inner-layer VLAN tag and an outer-layer VLAN tag in the network identifier.

12. The device according to claim 11, wherein the processor is further caused by the machine-executable instructions to:
    send a flow entry to an Openflow switch in the network with virtualization of network functions, wherein the flow entry is configured to instruct the Openflow switch to send a first user control packet from a second user to the vBRASSO;
    select a vBRAS for authenticating the second user from the vBRAS resource pool based on a load balancing principle when receiving the first user control packet sent by the Openflow switch based on the flow entry, and
    forward the first user control packet to the vBRAS for authenticating the second user.

13. The device according to claim 11, wherein the processor is further caused by the machine-executable instructions to:
    send a VXLAN tunnel configuration to a second POP switch in the network with virtualization of network functions, wherein the VXLAN tunnel configuration is to instruct the second POP switch to establish a VXLAN tunnel with at least one vBRAS in the vBRAS resource pool in such a way that the second POP switch sends a first user control packet from a second user to the at least one vBRAS through the established VXLAN tunnel, and
    determines a vBRAS for authenticating the second user based on a response of each of the at least one vBRAS to the first user control packet.

14. The device according to claim 11, wherein when determining the first POP switch for forwarding a video-on-demand flow to the user based on the user information, the processor is caused by the machine-executable instructions to:
    determine a POP switch with a network configuration matched with a network identifier in the user information in the network with virtualization of network functions as the first POP switch for forwarding a video-on-demand flow to the first user;
    the network identifier comprises: an inner-layer VLAN tag and an outer-layer VLAN tag.

15. The device according to claim 11, wherein when determining the first POP switch for forwarding a video-on-demand flow to the user based on the user information, the processor is caused by the machine-executable instructions to:
    determine a POP switch with a network configuration matched with a VXLAN identifier included in a network identifier in the user information in the network with virtualization of network functions as the first POP switch for forwarding a video-on-demand flow to the first user;
    the network identifier further comprises: an inner-layer VLAN tag, and an outer-layer VLAN tag.

\* \* \* \* \*